United States Patent [19]

Bourgault

[11] Patent Number: 5,357,884
[45] Date of Patent: Oct. 25, 1994

[54] ALL PURPOSE COULTER DRILL

[75] Inventor: Gerard F. J. Bourgault, St. Brieux, Canada

[73] Assignee: F.P. Bourgault Industries Air Seeder Division Ltd., St. Brieux, Canada

[21] Appl. No.: 954,035

[22] Filed: Sep. 30, 1992

[30] Foreign Application Priority Data

Jul. 8, 1992 [CA] Canada ............... 2073370

[51] Int. Cl.$^5$ ............... A01C 7/00
[52] U.S. Cl. ............... 111/186; 111/136; 111/195; 172/456
[58] Field of Search ............... 111/186, 187, 188, 194, 111/195, 136, 52; 172/382, 311, 456, 459, 78, 76, 264, 265, 408, 407, 452

[56] References Cited

U.S. PATENT DOCUMENTS

| | | |
|---|---|---|
| 2,691,353 | 10/1954 | Secondo ............... 111/52 |
| 3,362,361 | 1/1968 | Morrison, Jr. ............... 111/187 |
| 3,528,505 | 9/1970 | Bushmeyer et al. ............... 172/264 |
| 3,749,035 | 7/1973 | Cayton et al. ............... 111/85 |
| 4,009,668 | 3/1977 | Brass et al. ............... 111/85 |
| 4,320,805 | 3/1982 | Winter ............... 172/456 |
| 4,478,159 | 10/1984 | Melgoza ............... 111/52 |
| 4,506,609 | 3/1985 | Fuss et al. ............... 111/52 |
| 4,539,921 | 9/1985 | Morlock ............... 111/52 |
| 4,611,545 | 9/1986 | Nickeson et al. ............... 111/52 |
| 4,624,197 | 11/1986 | Drake ............... 111/52 |
| 4,699,221 | 10/1987 | Malinowski et al. ............... 172/265 |
| 4,700,641 | 10/1987 | Head, Jr. et al. ............... 111/194 |
| 4,726,303 | 2/1988 | Degelman et al. ............... 111/52 |
| 4,730,678 | 3/1988 | Denis et al. ............... 172/265 |
| 4,932,340 | 6/1990 | Benzel ............... 111/194 |

FOREIGN PATENT DOCUMENTS

| | | |
|---|---|---|
| 36713 | of 1890 | Canada . |
| 520715 | 1/1958 | Canada . |
| 1041376 | 10/1978 | Canada . |
| 1067348 | 12/1979 | Canada . |
| 1117377 | 2/1982 | Canada . |
| 1121216 | 4/1982 | Canada . |
| 1121219 | 4/1982 | Canada . |
| 1131999 | 9/1982 | Canada . |
| 1233075 | 2/1988 | Canada . |
| 1251997 | 4/1989 | Canada . |

Primary Examiner—Clifford D. Crowder
Assistant Examiner—Michael A. Neas
Attorney, Agent, or Firm—Fisher, Christen & Sabol

[57] ABSTRACT

A unique and improved seed and fertilizer coulter-type drill is disclosed. The drill has a plurality of coulter wheels in four rows, the front two rows of coulters cut first furrows and deposit seed. The rear two rows of coulters cover the seed in the first cut furrows and produce a second set of furrows in which fertilizer is deposited, approximately 1 inch away from the seed. The two sets of coulters are followed by a plurality of press or packer wheels which ensure good seed to soil contact and cover the *remaining fertilizer furrows.

20 Claims, 9 Drawing Sheets

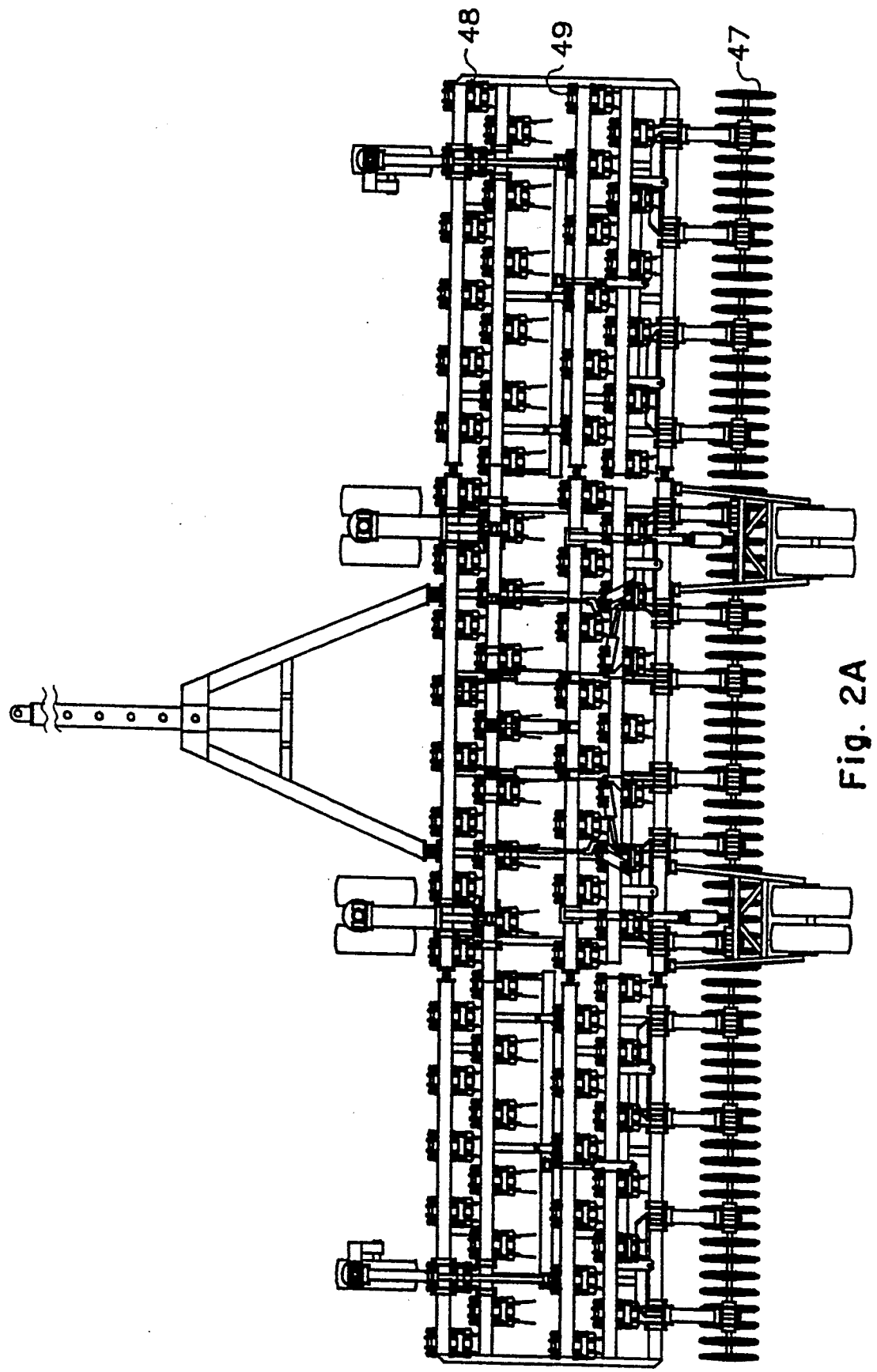

ALL PURPOSE COULTER DRILL

FIELD OF THE INVENTION

This invention relates to seed drills and more particularly, to coulter-type drills adapted to be used with an air seeder to dispense both seed and fertilizer.

In recent years there has been a trend in the prairie provinces and western states to move towards zero tillage farming operations. It has been found that leaving the ground intact with the prior years stubble thereon tends to greatly reduce soil erosion. The motivating force for no-till seeding is the need to reduce passes over the field thereby reducing erosion, moisture loss, fuel costs, and wear and tear on the tractor.

BACKGROUND OF THE INVENTION

The use of coulter discs to open and close furrows is not new. As early as 1890, Canadian Patent 36 713 for seed sowing machines issued. In more modern times, an example of furrow forming discs is found in U.S. Pat. No. 3,749,035, a precision depth seed planter, invented by Cayton. It is a modern attempt at using discs to form and cover furrows. None of these arrangements have proven satisfactory for a large no-till operation required today. Many of the coulter arrangements taught in the present art and earlier art tend to plug with soil or stubble, and become ineffective.

The inventor of the present invention, however, has experimented with many configurations and has found a unique in-line system for use with both seed and fertilizer which has proven to have surprising and unusually favourable results.

It is an object of the present invention to provide a farm implement which can be manipulated by a single operator which in one pass of the land cuts the furrow, deposits the seed and fertilizer and covers the same.

It is a further object of the present invention to have good seed to soil contact and to place fertilizer within approximately 1 inch of the seed.

It is a further object of the present invention to produce an efficient large capacity seeder.

SUMMARY OF THE INVENTION

Therefore, this invention seeks to provide a seed and fertilizer drill adapted to be pulled by a power source and connected to a fertilizer and seed supply means comprising: a frame means; an adjustable support means adapted to vary the height of the drill from the ground; a plurality of packer wheels; and a plurality of first and second furrow forming coulter wheels; each of said first furrow forming coulter wheels is mounted on said frame means such that it is adapted in operation to rotate at an acute angle to the line of travel of the drill, and to create a furrow into which seed is deposited; each of said second furrow forming coulter wheels is also mounted to rotate at an acute angle to the line of travel of the drill, each of said second coulter wheels being located behind one of said first coulter wheels, and slightly to the side thereof; said second furrow forming coulters in operation being adapted to push soil over said seed in said furrows made by said first coulters, while simultaneously creating second furrows adjacent said furrows made by said first furrow forming coulters, into which fertilizer is deposited; each of said packer wheels being positioned behind one of said second coulters and mounted to said frame means to rotate parallel to the line of travel; and each of said packer wheels being in register with said furrow created by one of said first furrow forming coulters; whereby in operation, said packer wheels press the soil over the seed in said furrows created by said first coulters, and push soil outwardly over said furrows created by said second coulters, thereby covering said fertilizer; said plurality of coulters being arranged such that in operation one pass of the implement creates a plurality of evenly spaced apart seeded rows with fertilizer being incorporated into the soil adjacent but not touching said seed.

In a preferred embodiment this invention seeks to provide a seed and fertilizer drill adapted to be pulled by a power source and connected to a fertilizer and seed supply means comprising: a frame means; an adjustable support means adapted to vary the height of the drill from the ground; and a plurality of furrow forming coulter wheels; said coulter wheels being arranged in forward and rearward pairs; each wheel of said pairs being spaced apart from the other and the two wheels converging slightly forwardly; each of said rearward pairs being located in line with and rearwardly of one forward pair; the wheels of each of said rearward pairs being closer to one another than the wheels of said forward pairs; wherein, when in operation, as said drill moves forwardly each of said forward pairs creates two first furrows into which seed is deposited and each of said rearward pairs push soil outwardly covering said first furrows while simultaneously creating two second furrows into which fertilizer is deposited.

In the preferred embodiment of the present invention the drill comprises three sections, a center section and two wing sections which are pivoted to the center section on either side thereof by means of horizontal pivots. The wing sections of the frame can be raised by means of hydraulic cylinders to a transport position. If necessary, further wing sections can be added with further folding mechanisms.

The frame of the drill has a hitch on the forward portion thereof adapted to be towed by a power source. The implement is also designed to tow or follow an air seeder having multiple compartments for fertilizer, seed, or combinations of both;—the air seeder supply lines being connected to the drill when in operation. The frame basically consists of five major cross beams under the first four of which are attached seed and fertilizer coulter assemblies. The last beam supports a plurality of packer wheels and rear transport wheels. Supporting the front of the main frame are a pair of dual tired castor wheels. As well, each wing section is supported at the front by at least one castoring transport wheel.

The unique aspect of the invention is the manner in which the coulters are mounted. In the first two rows, the coulter assemblies are staggered, both being for the creation of furrows and the deposit of seed. The coulters in the front two rows create furrows wherein seeds are deposited. The third and fourth rows are fertilizer coulters.

The coulter wheels in both the front and rear rows are mounted such that they rotate at an acute angle to the line of travel of the drill. Each rear fertilizer coulter wheel is aligned with a front seed coulter wheel but is slightly off to one side. The coulters can be mounted to rotate at an angle, either to the right or to the left of the line of travel as long there are equal numbers of coulters rotating in each direction. This will prevent a tendency of the implement to move to the right or the left.

It is preferable to have the rear fertilizer coulter wheel rotating in the same direction as the front seed coulter wheel. However, the rear coulter wheel will be mounted slightly to the side of the seed coulter wheel such that it will push soil outwardly into the seed furrow and at the same time create an adjacent second furrow into which fertilizer is deposited. Thereafter, a wedge-shaped packer wheel follows the fertilizer coulter. In a preferred embodiment the middle of the packer wheel is in register with the center of the seed furrow and presses the soil downwardly over the seed. At the same time its wedge-shaped circumference pushes soil outwardly and covers the fertilizer in the second furrow. The packer wheels are mounted such that they rotate in a direction parallel to the line of travel of the drill.

In a preferred embodiment both types of coulter wheels are arranged in pairs which converge slightly forwardly, usually from 4 to 7 degrees off the path of travel, and the rear fertilizer coulters are spaced slightly closer together than the front seed coulters. Each fertilizer coulter assembly follows directly behind a seed coulter assembly, and while making a second pair of inner furrows the fertilizer coulters also push earth outwardly thereby covering the seed in the furrows made by the seed coulter assembly. At the same time, fertilizer is deposited in the second pair of inner furrows. In a preferred embodiment, the rear coulters penetrate the ground approximately an inch deeper than the seed coulters. This has been found to be the ideal position to deposit fertilizer, that is to say approximately 1 inch below and to the side of the seed.

This arrangement of coulters ensures good soil to seed contact. The initial coverage of the seed by the fertilizer coulters is further improved by a set of trailing packer wheels which not only press the soil over the seed but also cover the fertilizer with soil. Fertilizer to soil contact is less important than seed to soil contact.

The coulter assemblies are spring loaded and can be raised independently of each other when an external force such as a rock or other obstacle is encountered. The spring is mounted in such a manner that it can be adjusted. The spring positioning provides equal resistance throughout the path of travel of the coulters when an obstacle is encountered. This arrangement reduces breakage.

The packer wheel assemblies are arranged on pivotal frames for up and down movement and are mounted on walking pivots so that they can rock side to side when obstacles are encountered. One packer wheel follows directly in line with each initial seed row.

Seed and fertilizer are transferred from the trailing air seeder bins, through a set of spider-like manifolds and delivery tubes to seed and fertilizer boots which are positioned inside and to the rear of each pair of coulter wheels. By the arrangement of coulters in the present invention, one pass of the machine leaves behind a plurality of fertilized seeded rows approximately 7 inches apart, although any spacing from 4 to 16 inches is possible.

To adjust the penetration depth of the coulters in the soil, a fairly complex series of turnbuckles, hydraulics and rocker bars are used. The front transport wheels and the trailing packer wheels are used to adjust the height during seeding. Three principal hydraulic cylinders are attached at one end to the center section frame and at the other to pivot brackets welded to a rocker bar. A forward extending turnbuckle is attached at one end to the rocker bar and at the other to a bracket on a parallelogram linkage of the front transport wheels.

Another turnbuckle extends rearwardly to sets of walking pivots which pivotally attach to parallelogram linkage support frames of the packer wheels. An arcuate attachment bracket is fixed to the bottom part of the parallelogram linkage of the front transport wheel and to the upper part of the parallelogram linkage of the rear packer wheels. Thus, an extension of the pistons of the hydraulic cylinders will rotate the rocker bar forwardly and cause the front transport wheel to be lowered while the rocker shaft pulls the rear turnbuckles forwardly, causing the packer wheel parallelogram linkage to move downwardly, lowering the packer wheels. This movement lifts the coulter wheels upwardly from the ground. Thus, during operation, retraction or expansion of the three hydraulic pistons lifts or lowers the coulters, depending upon the conditions encountered and the contours of the land.

Also attached to the center section packer wheel turnbuckles is an equalization linkage and another set of horizontally placed hydraulic pistons. One can also use in the alternative, rephasing hydraulic cylinders. When the operator wants to place the drill in the transport position, he activates the hydraulics so that the following sequence occurs: the trio of hydraulic cylinders, which are adapted to rotate the rocker bar, are extended and the rocker bar rotates forwardly; this moves the turnbuckle attached to the parallelogram linkage of the front transport castoring wheel forwardly, lowering the front transport wheel; at the same time, a corresponding pull of the rearwardly extending turnbuckles causes the rear packer wheels to move down and thereby clear the coulters from the ground; once this is accomplished, the independent hydraulic cylinders of the rear transport wheels are extended, pressing the rear transport wheels downwardly so that the packer wheels are not supporting the majority of the weight; thereafter, the pistons of the horizontal cylinders are retracted causing the turnbuckle equalization linkage to straighten out such that the brackets on the packer wheel parallelogram linkage are pushed rearwardly and the packer wheels move upwardly so that they are not in contact with the ground; thereafter the hydraulic cylinders which are connected to each of the wings are retracted, causing each wing to raise vertically upwardly on each side of the center main frame section. Thereafter the machine is ready to be towed in the transport position along a roadway or field to another seeding locale.

BRIEF DESCRIPTION OF THE DRAWINGS

The invention will be more clearly described in conjunction with the following drawings wherein:

FIG. 2A is a top view of the invention similar to FIG. 2, wherein the seed and fertilizer coulter assemblies are included;

DETAILED DESCRIPTION OF THE INVENTION

Figure 1:
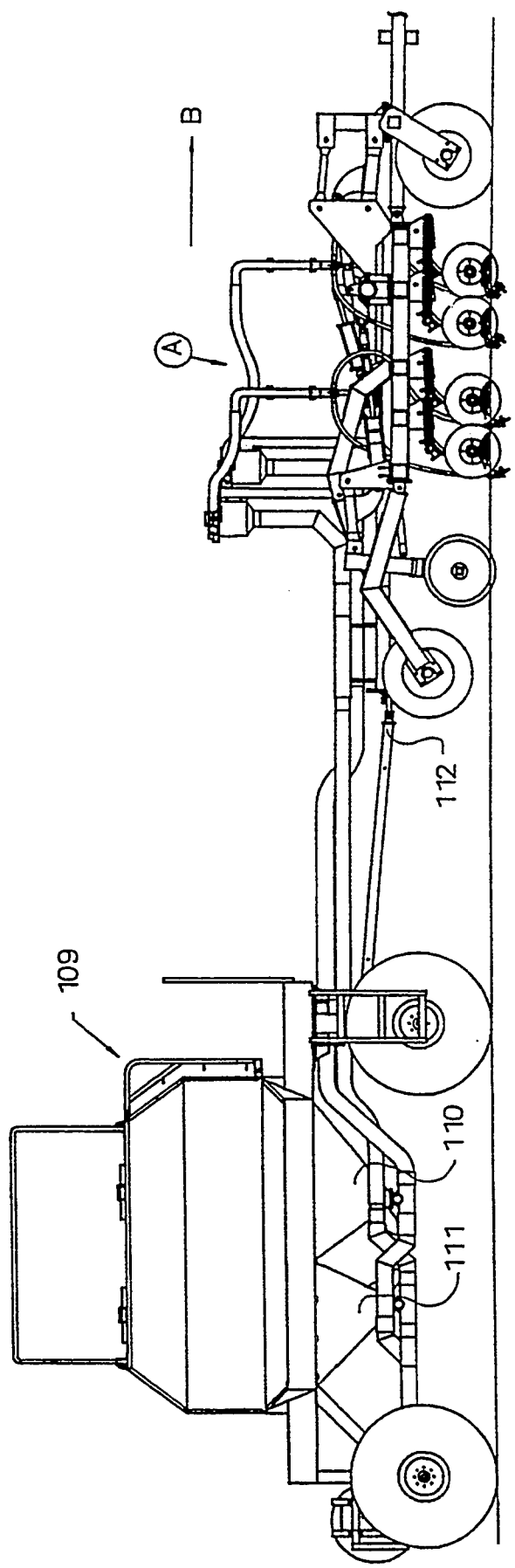
FIG. 1 is a schematic side view of the present invention with an air seeder in tow.

FIG. 1 is an overall side view of the invention, shown as A, coupled by a hitch 112 of an air seeder 109, which contains a fertilizer hopper 110 and a seed hopper 111. These hoppers are, of course, interchangeable. The direction of travel is shown generally as B.

FIGS. 2 through 7 show various views of the machine which will be described hereinafter in detail.

As shown in the accompanying figures, the drill has a hitch shown generally as 1, which is adapted to be attached to power source such as a tractor through an aperture 2. The hitch 1 is adjustable by means of apertures which are adapted to correspond to the cross member 3. The cross member 4 further strengthens the hitch. Two trailing members 5 are pivotally attached by horizontal pivot pins 6 to pivot brackets 7, which are fixedly attached to the front center main frame cross member 8.

The frame of the machine is made up of five cross members shown generally as 8, 9, 10, 11 and 12, in the center section. The cross beams 8 through 12 are supported and connected to one another by means of fore and aft frame support members, shown generally as 13.

Figure 2:
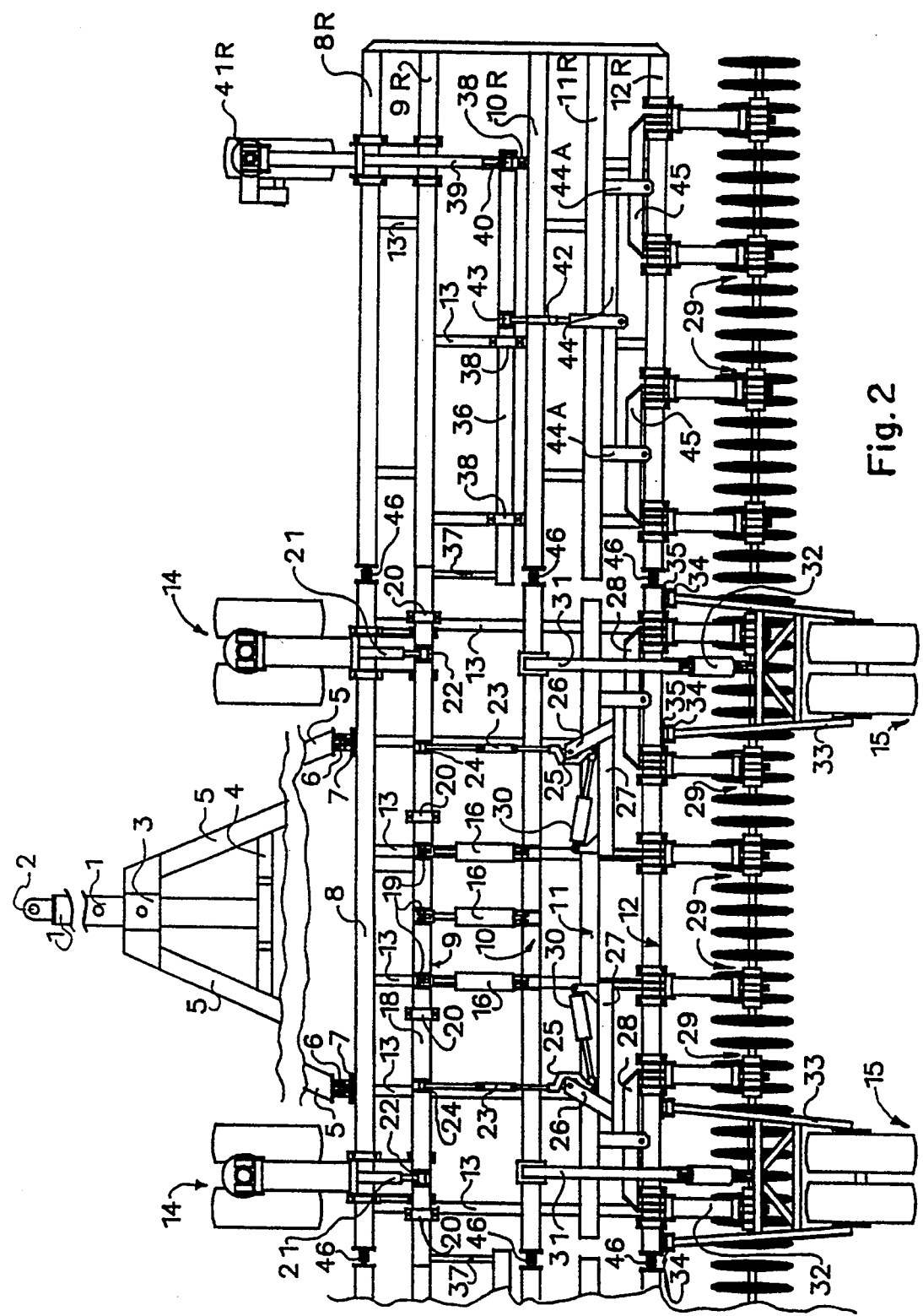
FIG. 2 is a partial top view of the present invention in the seeding/planting position.

FIGS. 2 and 2A illustrate an embodiment of the drill of the present invention which has two wing sections, a right and a left, the left being partially removed in FIG. 2 for clarity. The right section cross beams are labelled 8R, 9R, 10R, 11R and 12R.

The center section of the frame is supported at the front by means of two transport castor wheel assemblies shown generally as 14. These assemblies will be described in greater detail in later drawings.

For the purposes of transporting the implement when it is not in the seeding position, a pair of independently controlled non-castoring pairs of rear transport wheels are lowered and are shown generally as 15.

The principal activating means for regulating the height of the implement from the ground are a trio of large hydraulic cylinders, shown in the center section as 16. The hydraulic cylinders are pivotally attached to the cross beam 10 by means of pivot brackets 17. The piston ends of the hydraulic cylinders are pivotally attached to a rocker bar 18 in the central section by means of rocker bar center section hydraulic cylinder mounting brackets 19. The rocker bar 18 is rotatably mounted above the cross beam 9 by means of rocker bar support brackets 20.

Retraction or extension of the cylinders 16 causes rocker bar 18 to rotate rearwardly or forwardly respectively.

Pivotally attached to the rocker bar 18 are front adjustable elongate turnbuckles 21. These are pivotally attached to the rocker bar by means of rocker bar front turnbuckle pivot brackets 22. The turnbuckles are pivotally connected to brackets on parallelogram linkages, connected to the front castor wheel assemblies 14. These will be described in detail in subsequent drawings. For present purposes, it is sufficient to say that a rotation of the rocker bar 18 caused by an extension of the hydraulic cylinders 16, causes turnbuckles 21 to move forwardly which moves the transport wheels 14 downwardly.

Also connected to the central rocker bar 18 are a pair of adjustable rigid elongate rear turnbuckles 23. These are pivotally attached to the rocker bar by means of rocker bar rear turnbuckle pivot brackets 24. The rear end of turnbuckle 23 is attached to a packer wheel equalization linkage 25. Pivotally connected to equalization linkage 25 is equalization linkage/angled bracket 26 which is fixedly connected to packer wheel floating frame member 27. Frame member 27 is an elongate frame member which is parallel to rear cross beam 12.

Floating frame member 27 has welded to it a rearwardly extending walking pivot bracket 27A (shown in FIG. 4A) with a vertical rod at its extreme end. Walking pivot bracket 27A is adapted to hold walking pivot bar 28 and allow some play from side to side. Walking pivot bar 28 is pivotally attached to the press wheel assembly shown generally as 29. Assemblies 29 will be more fully described in subsequent drawings.

Also connected to equalization linkage 25 are independent hydraulic cylinders 30. There are two shown in the central section connected to each equalization linkage 25. These again will be described in greater detail in the subsequent drawings.

The raising and lowering of the rear transport wheel assemblies 15 is accomplished by means of independently operated hydraulic cylinders 32 which are pivotally attached to the rear transport wheel assemblies 15 and at the other end to an upstanding rigid frame member 31. The support frame for the transport wheels 15 is shown generally as 33. It is pivotally mounted by pivots 34 which are attached to rear transport wheel pivot brackets 35 which are fixedly attached to rear cross beam 12.

The movement of rocker bar 18 in one embodiment is transmitted to wing section rocker bars 36 by means of a connecting link shown as 37 which has ball joints at each end.

In an alternate embodiment wing section rocker bar 36 may be rotated by its own hydraulic cylinder (not shown). This cylinder could be in a master slave arrangement with cylinders 16.

Wing section rocker bars 36 are supported on the wing section frames by means of a plurality of wing rocker bar support brackets 38. The wing sections of the implement are supported at the front by means of single castoring transport wheels 41R (left wing section castor front transport wheel not shown). The linkage of these front transport wheels is connected to an elongate turnbuckle 39 which is pivotally mounted to rocker bar 36 by pivot bracket 40. Thus, in the first embodiment a forward rotation of rocker bar 18, activated by pistons 16, produces a similar forward rotation of wing section rocker bars 36 which causes bars 39 to move forwardly, thus lowering front castoring wing transport wheels 41R.

Pivotally attached to rocker bar 36 and extending rearwardly therefrom, is a rear wing section packer wheel turnbuckle 42. Turnbuckle 42 is fixedly attached to wing section rocker bar rear turnbuckle pivot bracket 43, which has a vertical rod through its two rear extremities in order to contain press wheel floating frame member 44. Press wheel floating frame member 44, by means of rearwardly extending brackets 44A, is pivotally connected to press wheel walking pivot bars 45, which are pivotally mounted to the support frame for the packer wheel assembly 29.

The two wing sections of the frame are pivotally mounted to the center section at cross beams 8, 10 and 12 by means of horizontal pivots 46. The mechanism for raising and lowering the frame wing sections will be described in more detail in subsequent drawings.

FIG. 2A shows the entire width of the machine with the seed coulter assemblies 48, and rear fertilizer coulter assemblies 49. These will be described in greater detail in subsequent drawings.

Figure 3:
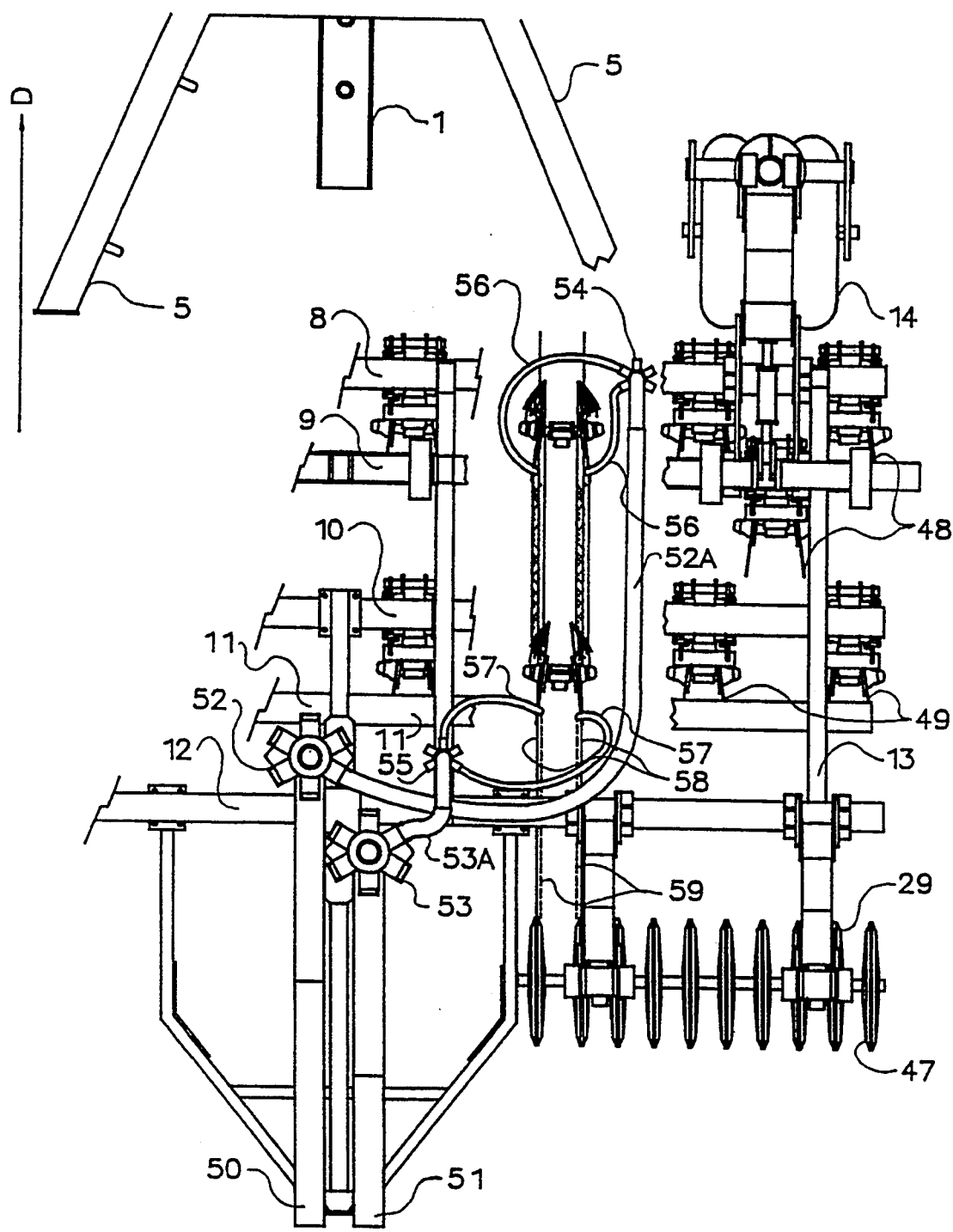
FIG. 3 is a schematic partial top view of the invention.

FIG. 3 is a partial plan view including a portion of the seed and fertilizer distribution system for the drill of the present invention. The seed coulter assemblies 48 are located under the fore part of the frame whereas the fertilizer assemblies 49 are located near the rear of the frame. The drawing also illustrates how each fertilizer coulter assembly 49 is rearward of and in line with a seed coulter assembly 48. One also notes that the coulter wheels of the fertilizer coulter assemblies 49, which also converge slightly forwardly, are closer together than the seed coulter wheels 48.

As previously mentioned, the present invention is used in conjunction with an air seeder from which a primary distribution feed pipe for seed 50 brings the seed to a primary seed distribution manifold 52. A second pipe 51, carries the fertilizer to the primary fertilizer distribution manifold 53. The seed then travels from the primary seed manifold 52 through a delivery pipe 52A to secondary seed distribution manifolds 54. From there the seed flows through seed lines 56 to seed boots (not shown in FIG. 3) which are attached near the rear of the coulters 48.

Similarly, fertilizer is conveyed from the primary fertilizer distribution manifold 53 through delivery lines 53A to the secondary distribution manifolds 55. Thereafter, the fertilizer flows through delivery tubes 57 into fertilizer boots (not shown) located to the rear of the fertilizer coulter assemblies 49.

In FIG. 3, the seed rows are shown by the solid line 58 and the fertilizer is deposited adjacent the seed rows and shown by the dashed lines 59.

The rear fertilizer coulter assemblies 49 are mounted to the frame such that their penetration is slightly deeper than that of the forward seed coulter assemblies 48. It has been shown that Fertilizer deposited approximately one inch below and to the side of the seed will produce the best results.

Figure 4:
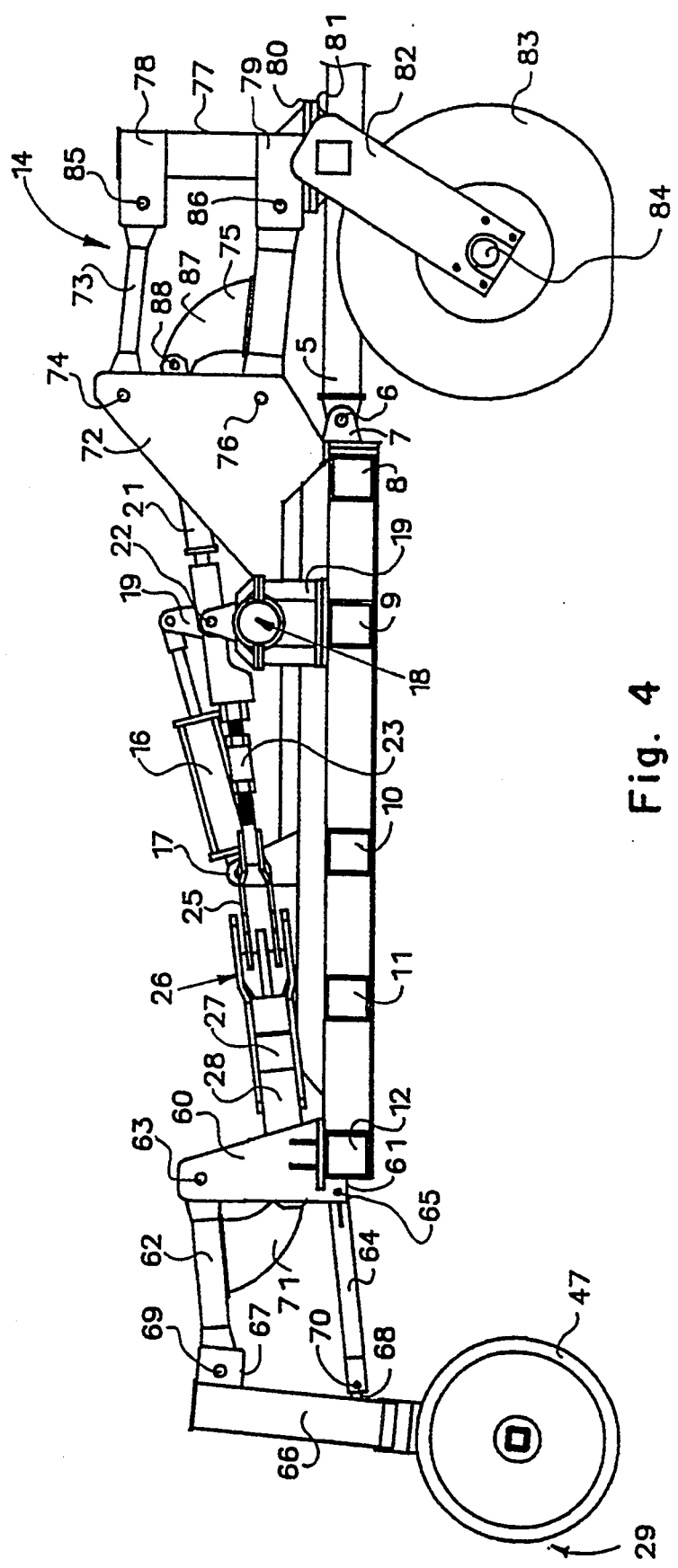
FIG. 4 is a partial side view of the frame and support system.

FIG. 4 is a partial sectional side view of the center section of the frame with the fertilizer/seed distribution systems removed, for sake of clarity. More particularly, FIG. 4 shows in greater detail, the parallelogram linkage and support mechanism for the packer wheel assemblies 29 and the front transport wheel assemblies 14.

Packer wheel assemblies 29 are pivotally mounted on a pair of upstanding planar packer wheel support brackets 60. These are fixedly mounted to cross beam 12 by means of U bolts 61. Pivotally mounted at point 63 is upper parallelogram linkage arm 62, and similarly, pivotally mounted at point 65 is lower parallelogram linkage arm 64. The two arms, 64 and 62, are pivotally mounted in parallel fashion to a U-shaped, substantially vertically oriented member 66 to which the packer wheel support shaft is mounted. This has upper and lower forwardly extending pivot brackets 67 and 68. The upper linkage arm pivot is shown as 69 and the lower linkage arm pivot is shown as 70. Fixedly attached to the upper parallelogram linkage arm 62 is a downwardly and forwardly extending arcuate bracket 71. Bracket 71 is pivotally connected to walking pivot 28, attached to floating frame member 27, attached to linkage members 26, 25, attached to turnbuckle 23, which is pivotally attached to rocker bar 18.

The front transport wheel assembly 14 is supported by means of a pair of front transport wheel assembly support brackets 72, which are fixedly attached to cross beam members 8 and 9 by means of U bolts (not shown). Pivotally attached at point 74 is upper parallelogram linkage arm 73, and pivotally attached at point 76 is lower parallelogram linkage arm 75. Upper and lower parallelogram linkage arms 73 and 75 are pivotally mounted at points 85 and 86 to vertically oriented front frame member 77 to which are welded upper rearwardly extending pivot bracket 78 and lower rearwardly extending pivot brackets 79. The lower portion of vertically oriented front frame member 77 is welded to upper castoring plate 80, which by means of a vertical pivot, rests upon lower castoring plate 81. Attached to lower castoring plate 81 is front transport shaft support frame member 82, which is adapted to support axle 84 on which are mounted front transport wheels 83.

In a preferred embodiment of the invention, each of the major front transport wheels attached to the central section, have a pair of transport wheels to support the weight of the drill of the present invention.

Fixedly attached to lower parallelogram linkage arm 75 is an upward rearwardly extending arcuate pivot bracket 87 which is connected by pivot pin 88 to forwardly extending turnbuckle 21 which as previously mentioned is pivotally connected to rocker bar 18 by pivot 22.

The placement of packer wheel assembly arcuate brackets 71 are reversed from front transport wheel arcuate brackets 87. This is necessary since a forward rotation of rocker arm 18 pushes turnbuckle 21 forwardly and pulls rear turnbuckle 33 forwardly. Thus, by the simple reverse placement of the bracket, a forward rotation of rocker bar 18 caused by a forward extension of the piston rod of cylinder 16, will lower the front transport wheel assembly 14 and at the same time, lower the rear press wheel assembly 29, thereby raising the frame and coulter assemblies 48 and 49 away from the ground.

Figure 4A:
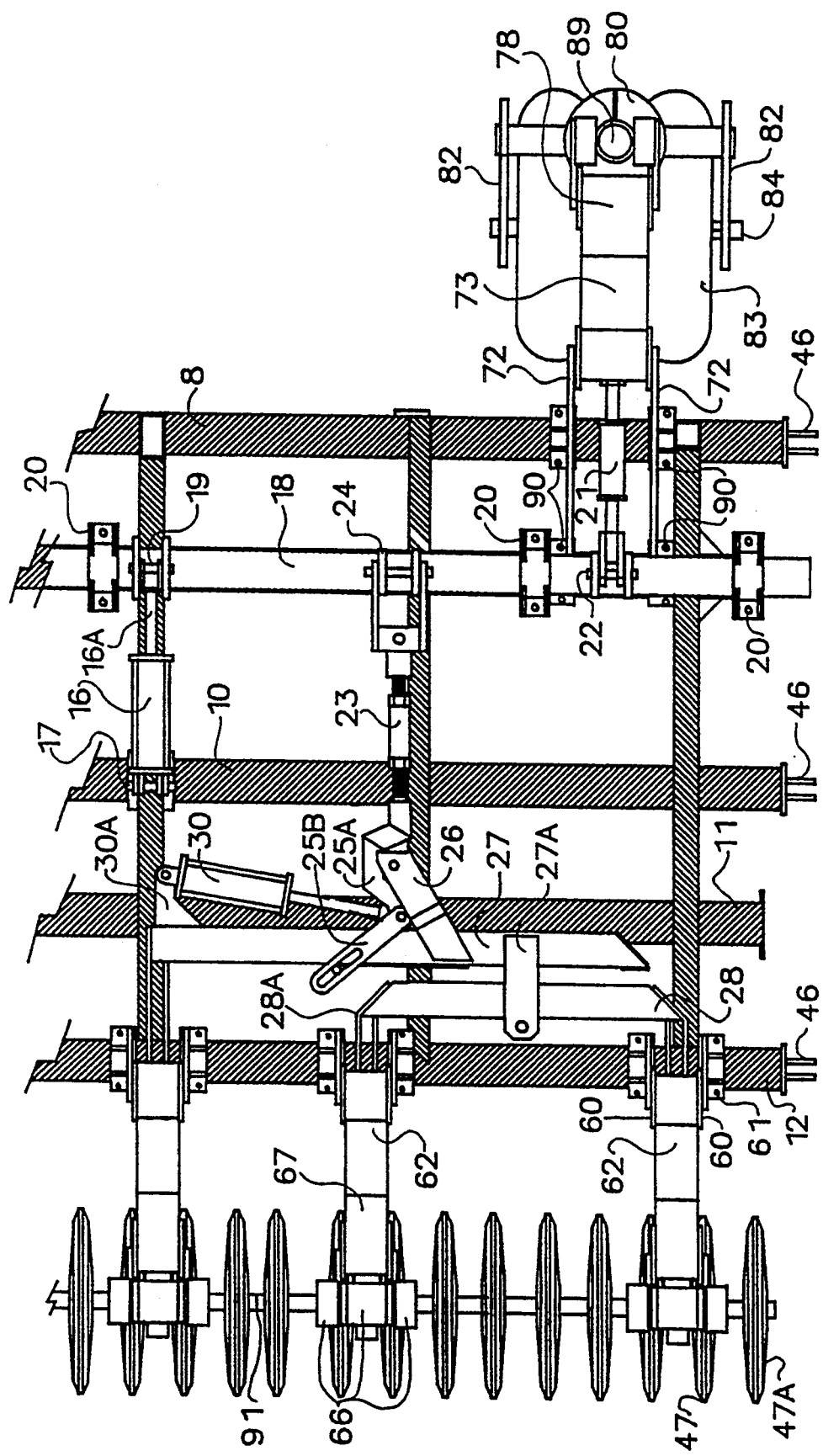
FIG. 4A is a partial top view of the frame and support adjustment system.

FIG. 4A is a top partial view of the mechanism shown generally in FIG. 4. Vertical pivot shaft 89 runs through the castoring plates 80 of the front transport wheel assembly 14. FIG. 4A also illustrates how front transport wheel support plates 72 are mounted to cross beam frame members 8 and 9 by means of U bolts 90. Also shown in FIG. 4A are packer wheel assemblies 29. One notes that each assembly contains a shaft with 10 packer wheels 47 thereon. There is a slight space 91 between adjacent packer wheel assemblies 29. The packer wheels 47A in FIG. 4A, which are adjacent to the space which exists between the packers attached to the main frame and to the wing are mounted on polyurethane hubs which allow the packers to move when the end of the wing drops lower than the main frame. This occurs when the end of the wing dips into a ditch or follows any downward incline while the main frame remains level. Since the frame to wing pivotal connection is above the packer wheels, the packer wheels come closer together as the wing dips to follow a downward incline. The polyurethane hubs then allow the end packer wheels 47A to deflect inwardly toward the center of each of the packer sections, without damaging the packer wheels.

FIG. 4A also illustrates in better detail the equalization linkage for the packer wheel assemblies. In normal field position, the equalization linkage 25A and 25B is in a folded condition with hydraulic cylinder 30 having its piston fully extended. Hydraulic cylinder 30 is fastened at one end to the equalization linkage 25 and at the other end to a hydraulic cylinder pivot bracket 30A. Thus, a front rotation of rocker bar 18, in this condition, will lower the transport wheels and the packer wheels. When it is desirable to raise the packer wheels while maintaining the front transport wheels in the lowered position such as is necessary during transport, the hydraulic cylinder 30 is activated and the piston retracted such that the floating frame member bar 27 moves rearwardly along with walking pivot bars 28, causing the packer wheels to lift, permitting them to be raised from the ground. This operation will be described in greater detail in conjunction with the operation of the rear transport wheel assemblies 15.

Figure 5:
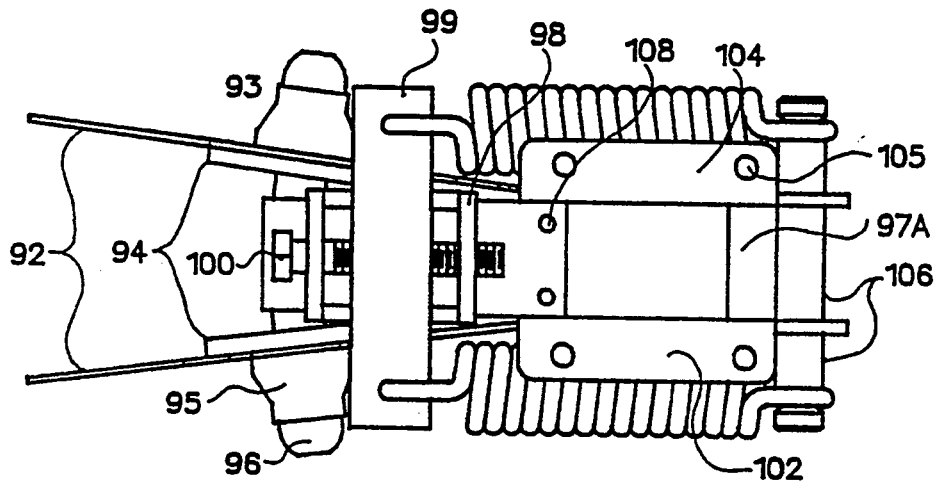
FIG. 5 is a top view of a seed or fertilizer coulter assembly.
Figure 5A:
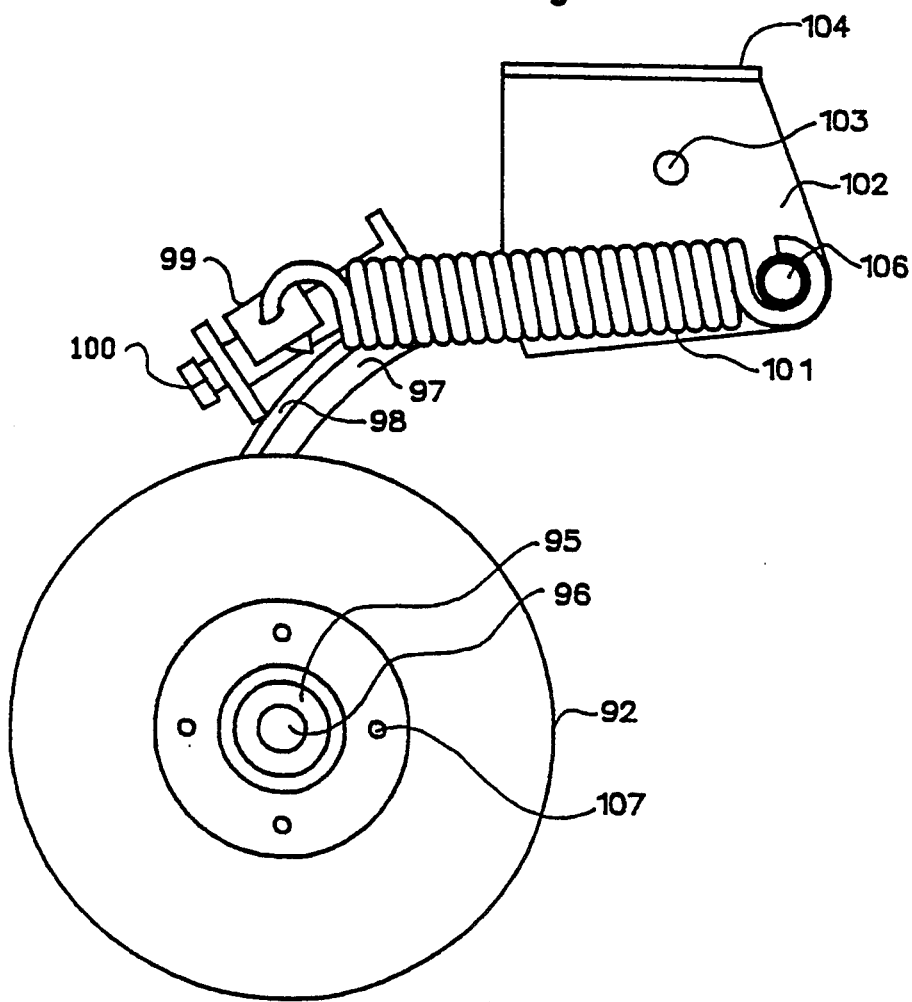
FIG. 5A is a side view of the assembly shown in FIG. 5.

FIGS. 5 and 5A are a top view and a side view, respectively, of detailed drawings of the seed and fertilizer coulter disc assemblies 48 and 49.

The assemblies consist of a pair of planar coulter discs 92. These are mounted on a double curved axle 93. The curve is necessary in order that the coulters converge slightly forwardly. By having both sets of coulters converge slightly forwardly there is less chance of the coulters becoming plugged with stubble, lumps of clay, rocks or other such obstacles.

Mounted on the double curved axle are a pair of flanges 94 which have machined surfaces, and are integral with the hubs 95, having dust caps 96. Through apertures 107 the flange to coulter bolts are passed and the coulters 92 secured to the flanges 94. Curved axle 93, by means of a bracket, is mounted upon a curved elongate shank 97.

The upper end of the shank contains a looped end 97A. Mounted on the shank 97 by means of a U bolt (not shown) is a rear spring retainer support bracket 98. This in turn supports an adjustable rear spring retainer 99. A spring 101, which is attached to adjustable rear spring retainer 99, can be tensioned or relaxed by means of spring tension adjustment bolt 100. The coulter assembly is supported by a shank support bracket 102 having two right-angled upper flanges 104, which by means of U bolts, through apertures 105, attaches the coulter assemblies 48 and 49 under the cross beams 8, 9, 10, and 11. The support plates 102 are also equipped with apertures 103 through which a bolt passes through the looped end 97A of the shank. Between the bolt (not shown) and the looped end of the shank 97A, is a bushing (not shown). The shank support bracket 102 is also equipped with a pair of tubular lateral projections 106, adapted to retain the front ends of the springs 101. The rear spring retainer support bracket 98 is fastened to the shank 97 with U bolts (not shown) through holes 108.

The placement of the spring 101 in relation to the support plate 102 and the adjustable rear spring retainer 99 is important in that, if a force is applied to a coulter wheel 92 and the coulter assembly moves upward because of that force, the force on the coulter caused by the spring tension on the coulter remains substantially constant because of the path of arcuate movement. Thus, if a very large obstacle is encountered, the force exerted on the spring will not damage any of the components of the drill.

Figure 6:
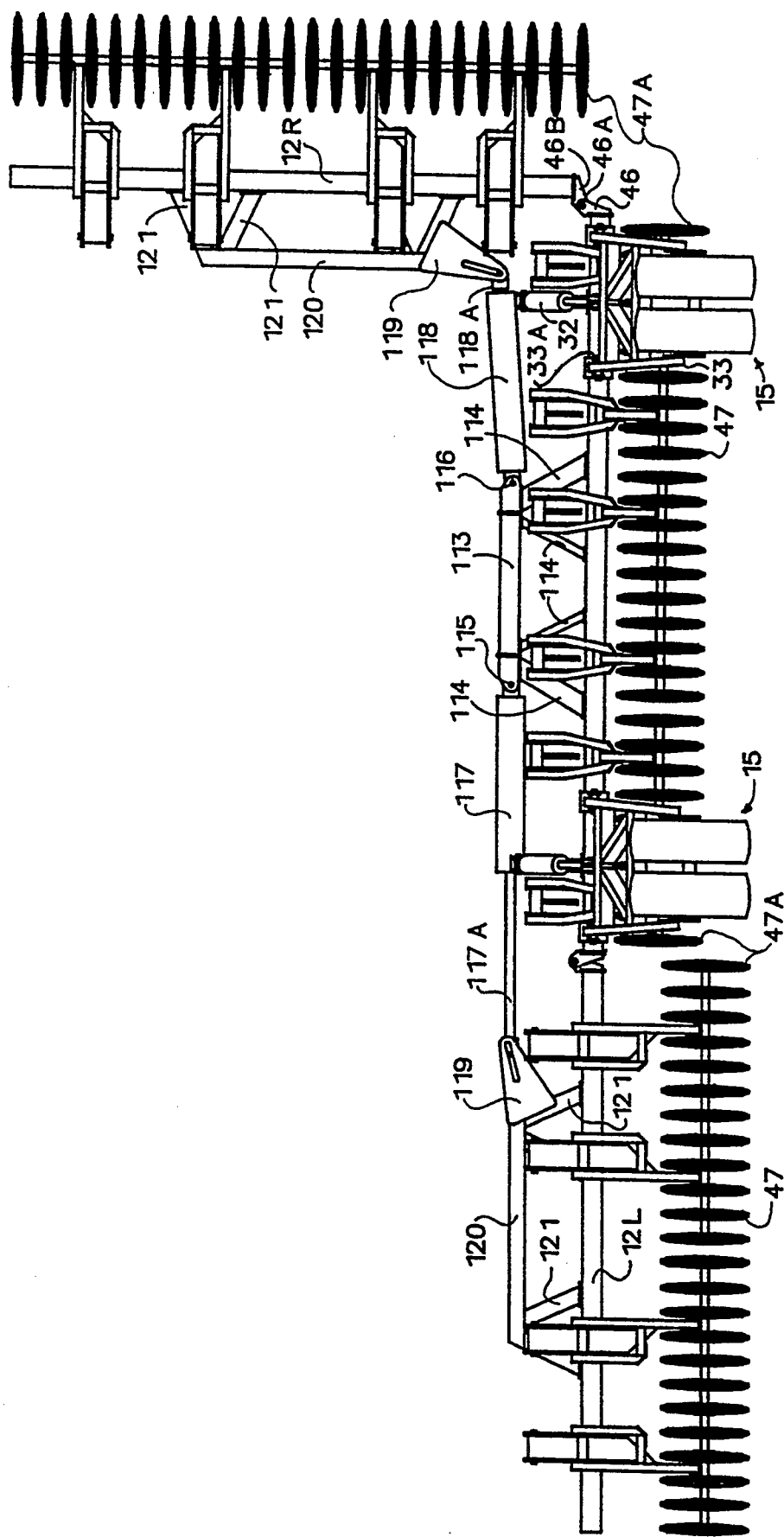
FIG. 6 is a partial rear view of the invention with one wing section in the transport position.

FIG. 6 is a partial rear view of a preferred embodiment of the invention showing the right wing section raised to the transport position and the left wing section in the field position. The packer wheels 47 in the central section have been raised to be out of contact with the ground. FIG. 6 shows a hydraulic cylinder support member 113 which is supported by truss-type legs 114. Legs 114 are fixedly attached by welding or the like to the cross beams 10 of the frame. At each end of the bridge 113 are pivot brackets for pivotally connecting the hydraulic cylinders 117 and 118. The piston 118A is shown in the retracted transport position while the piston 117A is in the extended field position. The ends of the pistons are pivotally attached to a pivotal flange 119. Pivotal flanges 119 are fixedly mounted to wing trusses 120 which are supported by legs 121. The wing sections, as previously mentioned, are attached to the central sections by pivots 46 through which are inserted horizontal pivot pins 46A to connect pivot brackets 46B, fixedly mounted to the end of wing section cross beams 8R, 10R and 12R.

Figure 7:
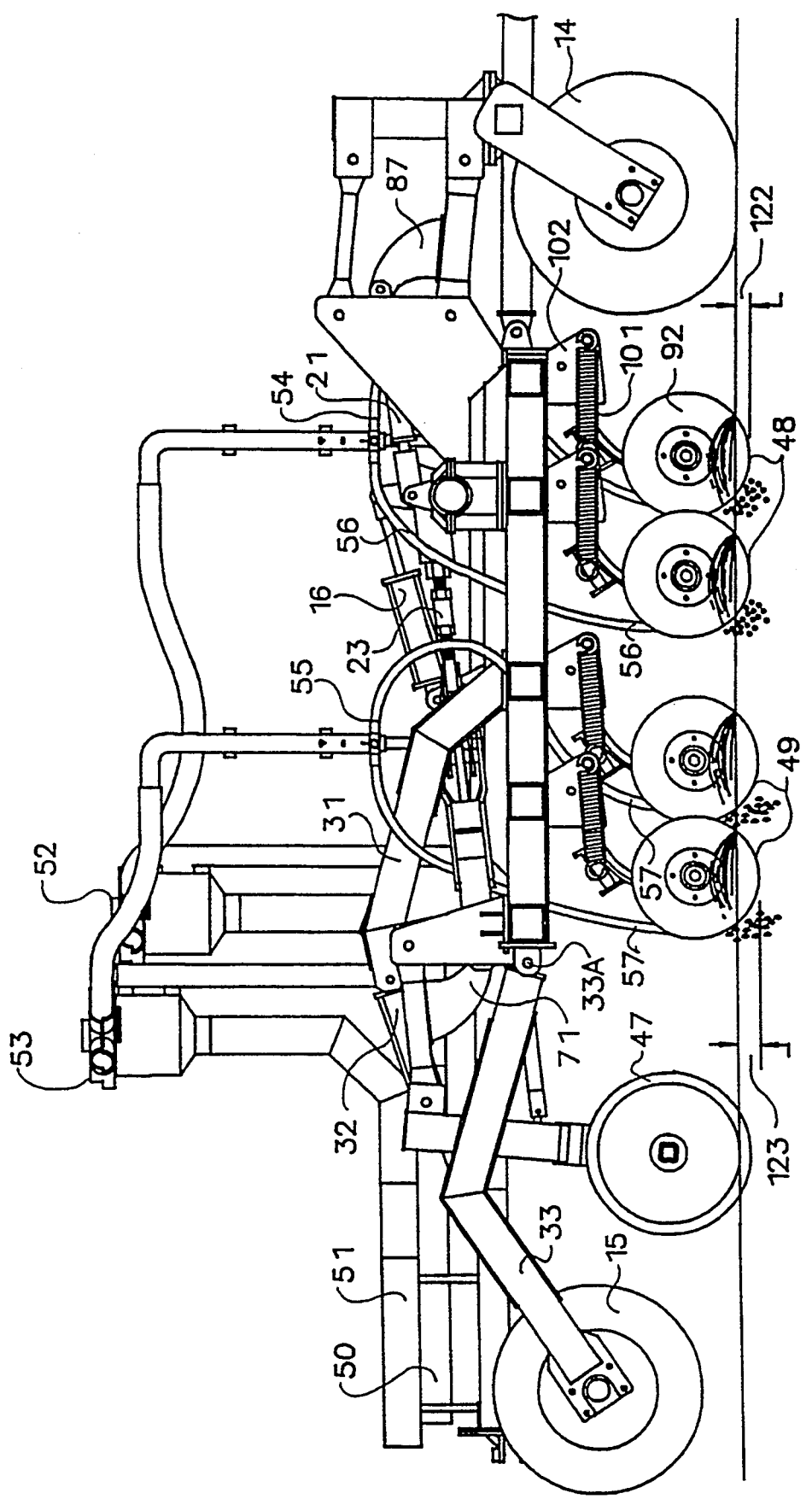
FIG. 7 is a schematic partial side view of the invention.

The operation of the all-purpose coulter-type drill will now be explained in conjunction with FIG. 7. As a starting point, we will assume that the drill is in a position as shown in FIG. 7, i.e. the operating position. The two wing sections are lowered, the rear transport wheels 15 are raised and the rear section of the drill is supported by the packer wheels 47 while the front portion of the drill is supported by the transport wheel assemblies 14. The front seed coulter assemblies 48 are penetrating the ground to a depth shown by lines marked 122 (that is the appropriate seed row depth), whereas the rear fertilizer coulters are penetrating the ground to a depth shown as gap 123 which is slightly larger, approximately one inch under normal circumstances.

If particularly soft ground is encountered and the coulters 48,49 are penetrating greater than the depth shown as 122 and 123, respectively, the piston of master cylinder 16 is activated to extend the piston slightly which causes rocker bar 18 to rotate forwardly causing turnbuckle 21 to exert pressure on arcuate bracket 87 thereby causing transport castor wheel assembly 14 to be lowered, thereby raising the front end of the frame slightly, lifting the coulter assemblies 48, 49. At the same time, rear turnbuckle 23 is pulled forwardly, exerting pressure on arcuate bracket 71, causing packer wheels 47 to be lowered, thus lifting the rear portion of the frame upwardly and reducing the penetration of the rear fertilizer coulter assemblies 49. Conversely, if particularly hard ground is encountered master cylinder 16 is retracted causing front transport wheels 14 and packer wheels 47 to be lifted slightly upwardly allowing for greater penetration of the coulters in the soil.

Once the seeding/fertilizing operation is complete and the operator wishes to move the drill to another location for the purpose of further planting or storage, the following steps occur.

Master cylinders 16 are extended fully thereby exerting pressure on turnbuckles 21 and 23, thereby lifting the coulter assemblies 48 and 49 completely off the ground, the drill being supported at the front by means of the front transport castor wheel assemblies 14, and at the rear by the packer wheels 47. Thereafter, cylinders 32 are activated and the pistons extended fully, causing rear transport wheel assemblies 15 to be lowered to their fullest extent. Thereafter, horizontally disposed hydraulic cylinders 30 are activated and the pistons fully retracted causing pressure against floating frame member 27 and walking pivot bar 28, thereby forcing bracket 71 rearward and packer wheels 47 to be lifted free of the ground. At that point the center section packer wheels, as shown in FIG. 6, are raised above the rear transport wheels. Thereafter, hydraulic cylinders 117 and 118 are activated, retracting pistons 117A and 118A, causing the wings to rise upwardly into a vertically disposed position. Thereafter the implement can be moved to another location without injuring the packer wheels or any of the coulter assemblies.

To return to the planting position, the steps aforementioned are simply reversed.

Although a particular embodiment of the invention has been described in detail it is understood that the scope of the invention covers any arrangement of forward and rearward pairs of coulters which resembles that of the present invention.

What I claim as my invention is:

1. A seed and fertilizer drill adapted to be pulled by a power source and connected to a fertilizer and seed supply means comprising:
   a frame means;
   an adjustable support means adapted to vary the height of the drill from the ground; and
   a plurality of furrow forming coulter wheels;
   said coulter wheels being arranged in at least one row of forward pairs and at least one row of rearward pairs;
   each wheel of each of said pairs being spaced part from the other to a distance such that in Operation each wheel of each of said pairs forms a distinct and separate furrow;
   each of said pairs of said wheels converging slightly forwardly such that in operation said wheels turn at an acute angle to the line of travel while the planar surfaces of said wheels remain generally perpendicular to the ground;
   said wheels of each of said rearward pairs being spaced apart to a lesser distance than said forward pairs;
   each of said rearward pairs being adapted to cooperate with and be in slightly offset alignment with, and being located rearwardly of one of said forward pairs;
   and further comprising a plurality of packer wheels located rearwardly of said rearward pairs of coulter wheels;
   each of said packer wheels being in register with a center line of one of said furrows created by a wheel of one of said forward pairs of coulters wherein, when in operation, as said drill moves forwardly seed is deposited into each furrow created by each wheel of said forward pairs and each wheel of each of a cooperating rearward pair pushes soil outwardly and laterally covering seed in said furrows created by each wheel of a cooperating forward pair while simultaneously creating two second furrows into which fertilizer is deposited and thereafter each of said packer wheels presses the soil over one of said furrows created by said forward pairs of coulters and pushes soil outwardly covering fertilizer deposited in one of said second furrows.

2. A drill as claimed in claim 1 wherein, when in operation, said rearward pairs of coulter wheels are adapted to penetrate the earth deeper than said forward pairs of coulter wheels.

3. A drill as claimed in claim 1 including first and second rows of furrow forming forward pairs of seed coulters and first and second rows of furrow forming rear pairs of fertilizer coulters;
   wherein said first row of seed coulters are adapted to cooperate with and are in slight offset alignment with said first row of fertilizer coulters and said second row of seed coulters are adapted to cooperate with and are in slight offset alignment with said second row of fertilizer coulters such that when in operation the drill creates a plurality of seed rows approximately 6 inches apart with fertilizer deposited adjacent to but not touching said seed.

4. A drill as claimed in claim 1 wherein said pairs of coulters are mounted under said frame means and include a pair of tension springs;
   said tension springs being adjustable by means of a threaded bolt;
   said springs being positioned such that in operation when a coulter disc strikes an obstacle in or on the ground, it is lifted upwardly with a constant force exerted on the coulter throughout the path of upward movement.

5. A drill as claimed in claim 1 wherein said packer wheels are mounted for rotation on a shaft in groups of 6 to 12 packer wheels depending upon the width of the coulter drill;
   said shaft being connected to a walking pivot and a horizontal pivot such that in operation said packers may be raised or lowered and rock from side to side, depending upon the contour of the land.

6. A seed and fertilizer drill adapted to be pulled by a power source and connected to a fertilizer and seed supply means comprising:
   a frame means having a forward portion and a rear portion,
   an adjustable support means adapted to vary the height of the drill from the ground,
   a plurality of first furrow forming coulter wheels, said first coulter wheels being mounted in pairs to said frame means under the forward portion of said frame means in two rows and being adapted to create furrows into which seed is deposited, wherein the coulter wheels of each pair are spaced apart to a distance such that in operation each pair of said first coulter wheels creates two distinct and separate furrows,
   a plurality of second furrow forming coulter wheels, said second coulter wheels being mounted in pairs to said frame means under the rear portion of said frame means in two rows and being adapted to create furrows into which fertilizer is deposited, wherein the coulter wheels of each pair are spaced apart to a distance such that in operation each pair of said first coulter wheels creates two distinct and separate furrows, each of said pairs of second furrow forming coulter wheels being mounted directly behind one of said pairs of said first furrow forming coulter wheels, said wheels of said pairs of second furrow forming coulter wheels being spaced apart from one another to a lesser degree and being mounted to penetrate the earth to a greater depth than said first furrow forming coulter wheels, such that in operation during forward travel, each wheel of said second furrow forming coulter wheels is adapted to push soil over said seed in one of said furrows made by said first furrow forming coulters, while simultaneously creating a second furrow, adjacent to and deeper than said one of said furrows made by said first furrow forming coulters, into which fertilizer is deposited, and a plurality of packer wheels, said packer wheels being positioned behind said second furrow forming coulters and mounted to said frame means to rotate parallel to the line of travel, each of said packer wheels being in register with a center line of one of said furrows created by said first furrow forming coulters, whereby in operation, said packer wheels compact said soil pushed over the seed in said furrows created by said first furrow forming coulters, and simultaneously push soil outwardly over said furrows created by said second furrow forming coulters, thereby covering said fertilizer.

7. A drill as claimed in claim 6 wherein said coulter wheels of each pair converge slightly forwardly such that in operation said coulter wheels rotate at an acute angle to the line of travel, the angle of rotation of one of said coulter wheels being equal to and opposite to the angle of rotation of the other coulter wheel of said pair, the planar surfaces of said coulter wheels being generally perpendicular to the ground.

8. A drill as claimed in claim 6 or claim 1 wherein said packer wheels are adapted to be raised or lowered to vary the penetration depth of the coulter wheels.

9. A drill as claimed in claim 1 or claim 6 wherein said fertilizer and seed supply means includes an air seeder, seed and fertilizer supply pipes, primary and secondary fertilizer and seed manifolds, seed and fertilizer delivery tubes, and seed and fertilizer boots, the boots being attached to a shank mounted to said coulters.

10. A seed and fertilizer drill adapted to be pulled by a power source and connected to a fertilizer and seed supply means comprising:

a frame means;

an adjustable support means adapted to vary the height of the drill from the ground, wherein said adjustable support means includes front and rear transport wheels and a plurality of packer wheels;

a plurality of furrow forming coulter wheels;

said coulter wheels being arranged in at least one row of forward pairs and one row of rearward pairs;

each wheel of each of said pairs being spaced apart from the other to a distance such that in operation each of said wheels of said pairs forms a distinct and separate furrow;

said wheels of each of said pairs converging slightly forwardly such that in operation said wheels rotate at an acute angle to the line of travel;

in operation the planar surfaces of said coulter wheels are generally perpendicular to the ground;

each of said wheels of each of said rearward pairs being spaced apart from each other a lesser distance than said wheels of said forward pairs;

and each of said rearward pairs being adapted to cooperate with, and be in slightly offset alignment with, and rearwardly of one of said forward pairs;

wherein in operation as said drill moves forwardly seed is deposited into each furrow created by each wheel of said forward pairs, and each wheel of a cooperating rearward pair pushes soil outwardly covering seed in said furrows created by a respective forward pair, while simultaneously creating two second furrows into which fertilizer is deposited;

said fertilizer being deposited deeper than said seed as said rearward pairs of coulter wheels are adapted to penetrate the earth deeper than said forward pairs of said coulter wheels;

and thereafter, each of said packer wheels, being located rearwardly of said rearward pairs of coulter wheels, and in register with the center line of one of said furrows created by a wheel of a forward pair of said coulter wheels, presses the soil covering the seed in said first furrows and pushes soil outwardly thereby covering the fertilizer deposited in said second furrows.

11. A drill as claimed in claim 10 including a hydraulic means;

wherein said front transport wheels and said packer wheels are indirectly connected to one another by a connecting means;

said connecting means being indirectly connected to said hydraulic means such that said front transport wheels and said packer wheels are adapted to be raised or lowered in concert.

12. A drill as claimed in claim 11 including an additional hydraulic means indirectly connected to said packer wheels such that said packer wheels can be raised or lowered independently of said front transport wheels.

13. A drill as claimed in any one of claims 1, 6 or 10 wherein said frame means comprises a center section and two or more wing sections and further comprising hydraulic means adapted to lift said wing sections off the ground to a transport position or lower said sections downwardly to a field operating position;

said wing sections further comprising castoring front transport wheels, and connection means;

said connection means being adapted to transmit motion from said center section hydraulics to packer wheels and front transport wheels associated with said wing sections.

14. A drill as claimed in claim 13 wherein said packer wheels are composed of steel, with the exception of those packer wheels at each end of said center section and those packer wheels adjacent to the innermost end of each of said wing sections, these being resilient in order to avoid breakage during lifting and lowering of said wing section.

15. A drill as claimed in claim 10 including additional hydraulic means, said hydraulic means being directly connected to said rear transport wheels and adapted to raise or lower the same;

said rear transport wheels including two pairs of wheels being pivotally mounted to said frame means and being non-castorable.

16. A drill as claimed in claim 10 wherein said front transport wheels are mounted in pairs and are castorable.

17. A seed and fertilizer drill adapted to be pulled by a power source and connected to a pneumatic fertilizer and seed supply means comprising:

a frame means;

an adjustable support means adapted to vary the height of the drill from the ground;

a plurality of packer wheels;

and a plurality of forward and rearward furrow forming coulter wheels;

said forward coulter wheels being arranged in at least one row;

each of said forward coulter wheels being mounted for rotation at an acute angle to the line of travel, in a plane generally perpendicular to the ground;

generally one half of said forward coulter wheels being angled to one side of the line of travel and the other half being angled to the opposite side of the line of travel;

each of said forward coulter wheels being adapted to cooperate with a seed depositing means, such that in operation, seed is deposited behind each of said forward coulters in a first furrow created by same;

said rearward coulter wheels being arranged in at least one row behind said forward coulter wheels, and being mounted for rotation at an acute angle to the line of travel in a plane generally perpendicular to the ground;

generally one half of said rearward coulter wheels being angled to one side of the line of travel and the other half of said coulter wheels being angled to the opposite side of the line of travel;

each rearward coulter wheel being mounted to cooperate with one of said forward coulter wheels and angled to the same side of the line of travel as said forward coulter wheel;

each rearward coulter wheel, which is mounted to cooperate with said one of said forward coulter wheels, being mounted rearwardly of said forward coulter wheel in slightly offset alignment such that in operation each of said rearward coulter wheels pushes soil into a first furrow created by said forward coulter wheel with which it is mounted to cooperate with, while simultaneously creating a second furrow adjacent said first furrow;

said rearward coulter wheels being mounted to penetrate the soil to a depth at least as great as said forward coulter wheels, and adapted to cooperate with a fertilizer depositing means, such that in operation, fertilizer is deposited behind each of said rearward coulter wheels in said second furrows;

said fertilizer being placed at least as deep, and to one side of, said seed deposited in said adjacent first furrow;

said packer wheels being positioned behind said rearward furrow forming coulter wheels and mounted to said frame means to rotate parallel to the line of the travel;

and each of said packer wheels being in register with a center line of one of said first furrows created by said forward furrow forming coulters;

whereby, in operation, said packer wheels compact said soil pushed over the seed in said furrows created by said forward furrow forming coulters, and simultaneously push soil outwardly over said second furrows created by said rearward furrow forming coulters, thereby covering said fertilizer.

18. A seed drill as claimed in claim 17 including first and second rows of forward coulters and first and second rows of rearward coulters;

each of said rearward coulters in said first row of rearward coulters being adapted to cooperate with a forward coulter in said first row of forward coulters and each of said rearward coulters in said second row of rearward coulters being adapted to cooperate with a forward coulter in said second row of forward coulters.

19. A seed drill as claimed in claim 17 wherein said forward coulters rotate at an acute angle of 4° to the line of travel and its cooperating rearward coulter rotates at an angle of 3° to the line of travel.

20. A seed drill as claimed in claim 17 wherein said rearward coulters penetrate the soil to a depth such that said second furrows are generally 1 inch deeper than said first furrows.

* * * * *